US011782918B2

(12) United States Patent
Sun et al.

(10) Patent No.: US 11,782,918 B2
(45) Date of Patent: Oct. 10, 2023

(54) SELECTING ACCESS FLOW PATH IN COMPLEX QUERIES

(71) Applicant: International Business Machines Corporation, Armonk, NY (US)

(72) Inventors: Sheng Yan Sun, BeiJing (CN); Shuo Li, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 17/118,780

(22) Filed: Dec. 11, 2020

(65) Prior Publication Data
US 2022/0188308 A1   Jun. 16, 2022

(51) Int. Cl.
*G06F 16/00* (2019.01)
*G06F 16/2453* (2019.01)
*G06N 20/00* (2019.01)

(52) U.S. Cl.
CPC ......... *G06F 16/2453* (2019.01); *G06N 20/00* (2019.01)

(58) Field of Classification Search
CPC ........... G06F 16/2453; G06F 16/24545; G06F 16/24547
USPC ........................................................ 707/716
See application file for complete search history.

(56) References Cited

U.S. PATENT DOCUMENTS

| 5,608,904 | A * | 3/1997 | Chaudhuri | G06F 16/24547 |
| 5,875,445 | A * | 2/1999 | Antonshenkov | G06F 16/24542 707/999.102 |
| 6,470,330 | B1 * | 10/2002 | Das | G06F 16/24542 707/718 |
| 6,643,636 | B1 * | 11/2003 | Au | G06F 16/24537 |
| 6,865,567 | B1 * | 3/2005 | Oommen | G06F 16/24542 |
| 7,219,091 | B1 * | 5/2007 | Bruno | G06F 16/8373 |
| 7,647,280 | B1 * | 1/2010 | Ramesh | G06F 16/2453 705/400 |
| 7,710,884 | B2 * | 5/2010 | Liu | G06F 9/5066 370/254 |
| 8,176,036 | B2 * | 5/2012 | Srivastava | G06F 16/2453 707/716 |
| 8,356,026 | B2 * | 1/2013 | Heimendinger | G06F 16/245 707/718 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Albert M Phillips, III
*Assistant Examiner* — Rezwanul Mahmood
(74) *Attorney, Agent, or Firm* — Daniel M. Yeates

(57) ABSTRACT

A computer-implemented method selects an access path for high cost and/or complex queries. The method includes building a classification model configured to identify a lowest cost access path. The method further includes receiving a query, where the query is configured to retrieve a set of data from a database. The method also includes generating an access map for the query, where the access map includes one or more potential access paths to execute the query. The method includes collecting, for the query, a set of data for each potential access path. The method further includes classifying, by the classification model, the query. The method also includes selecting a first access path of the one or more potential access paths and executing the query.

18 Claims, 5 Drawing Sheets

(56) References Cited

U.S. PATENT DOCUMENTS

| | | | | |
|---|---|---|---|---|
| 8,775,413 B2* | 7/2014 | Brown | G06F 16/24549 | 707/718 |
| 8,892,544 B2* | 11/2014 | Pendap | G06F 16/24542 | 707/718 |
| 9,063,973 B2* | 6/2015 | Bossman | G06F 16/24542 | |
| 9,378,243 B1* | 6/2016 | Korlapati | G06F 16/24537 | |
| 9,436,735 B1* | 9/2016 | Feng | G06F 16/24545 | |
| 9,569,496 B1* | 2/2017 | Li | G06F 16/24535 | |
| 9,773,032 B2* | 9/2017 | Perry | G06F 16/217 | |
| 9,934,051 B1* | 4/2018 | Ding | G06F 9/4552 | |
| 10,140,336 B1* | 11/2018 | Gu | G06F 16/285 | |
| 10,558,633 B1* | 2/2020 | Kim | G06F 16/2255 | |
| 10,726,013 B2* | 7/2020 | Oyamada | G06F 16/24545 | |
| 10,747,764 B1* | 8/2020 | Plenderleith | G06F 16/22 | |
| 10,915,529 B2* | 2/2021 | Chiba | G06F 16/24522 | |
| 10,936,589 B1* | 3/2021 | Beitchman | G06F 16/24542 | |
| 10,977,251 B1* | 4/2021 | Gibas | G06F 16/282 | |
| 11,086,870 B1* | 8/2021 | Subramanian | G06F 16/244 | |
| 11,093,496 B1* | 8/2021 | Bhatia | G06F 16/24552 | |
| 11,115,212 B1* | 9/2021 | Ladha | H04L 9/0894 | |
| 11,126,623 B1* | 9/2021 | Plenderleith | G06F 16/24542 | |
| 11,386,388 B2* | 7/2022 | Dhonde | H04L 63/08 | |
| 11,455,192 B2* | 9/2022 | Patel | G06F 9/485 | |
| 11,531,657 B1* | 12/2022 | Sankaran | G06N 20/00 | |
| 11,537,915 B2* | 12/2022 | Kabra | G06N 5/022 | |
| 11,567,916 B2* | 1/2023 | Chen | G06N 20/00 | |
| 11,567,936 B1* | 1/2023 | Jindal | G06F 16/24542 | |
| 11,645,283 B2* | 5/2023 | Cao | G06F 16/24549 | 707/718 |
| 11,650,983 B2* | 5/2023 | Chiba | G06F 16/24545 | 707/719 |
| 11,693,858 B2* | 7/2023 | Chen | G06F 16/24549 | 707/716 |
| 2003/0208621 A1* | 11/2003 | Bowman | H04L 67/1091 | 709/202 |
| 2004/0167904 A1* | 8/2004 | Wen | G06F 16/284 | |
| 2006/0155915 A1* | 7/2006 | Pereira | H04L 45/00 | 711/100 |
| 2006/0287979 A1* | 12/2006 | Beavin | G06F 16/2453 | |
| 2008/0270346 A1* | 10/2008 | Mehta | G06F 16/24542 | |
| 2009/0018992 A1* | 1/2009 | Zuzarte | G06F 16/24542 | |
| 2009/0024572 A1* | 1/2009 | Mehta | G06F 16/24542 | |
| 2009/0106746 A1* | 4/2009 | Chaudhuri | G06F 8/20 | 717/158 |
| 2009/0254916 A1* | 10/2009 | Bose | G06F 16/2455 | 718/104 |
| 2010/0036801 A1* | 2/2010 | Pirvali | G06F 8/443 | 707/E17.017 |
| 2011/0035369 A1* | 2/2011 | Halasipuram | G06F 16/24549 | 707/720 |
| 2011/0072006 A1* | 3/2011 | Yu | G06F 16/24535 | 707/718 |
| 2011/0173037 A1* | 7/2011 | Attenberg | G06Q 30/02 | 705/7.11 |
| 2011/0295839 A1* | 12/2011 | Collins | G06F 16/2428 | 707/719 |
| 2012/0036162 A1* | 2/2012 | Gimbel | G06F 16/2455 | 707/783 |
| 2012/0072412 A1* | 3/2012 | Bestgen | G06F 16/24549 | 707/718 |
| 2012/0130988 A1* | 5/2012 | Nica | G06F 16/24542 | 707/718 |
| 2013/0138630 A1* | 5/2013 | Yang | G06F 16/2453 | 707/716 |
| 2013/0262435 A1* | 10/2013 | Bossman | G06F 16/2455 | 707/716 |
| 2013/0262443 A1* | 10/2013 | Leida | G06F 16/24534 | 707/E17.014 |
| 2014/0095470 A1* | 4/2014 | Chen | G06F 16/24544 | 707/716 |
| 2014/0108378 A1* | 4/2014 | Alpers | G06F 16/24545 | 707/716 |
| 2014/0136513 A1* | 5/2014 | Ailamaki | G06F 16/22 | 707/718 |
| 2014/0188841 A1* | 7/2014 | Sun | G06F 16/24532 | 707/718 |
| 2014/0304251 A1* | 10/2014 | Bornea | G06F 16/9024 | 707/718 |
| 2015/0149440 A1* | 5/2015 | Bornea | G06F 16/2453 | 707/719 |
| 2015/0286681 A1* | 10/2015 | Baer | G06F 16/2282 | 707/754 |
| 2015/0286682 A1* | 10/2015 | Ziauddin | G06F 16/24542 | 707/718 |
| 2015/0310066 A1* | 10/2015 | Beavin | G06F 16/24542 | 707/716 |
| 2016/0055208 A1* | 2/2016 | Beavin | G06F 16/24544 | 707/716 |
| 2016/0140146 A1* | 5/2016 | Wexler | G06F 16/5846 | 707/741 |
| 2016/0292167 A1* | 10/2016 | Tran | G06F 16/24542 | |
| 2016/0328443 A1* | 11/2016 | Abraham | G06F 16/24524 | |
| 2016/0344772 A1* | 11/2016 | Monahan | G06F 16/248 | |
| 2017/0068704 A1* | 3/2017 | Feng | G06F 16/24545 | |
| 2017/0116275 A1* | 4/2017 | Baggett | G06F 16/24549 | |
| 2017/0177642 A1* | 6/2017 | Burger | G06F 16/24542 | |
| 2017/0270162 A1* | 9/2017 | Lee | G06F 16/2471 | |
| 2017/0277750 A1* | 9/2017 | Fan | G06F 16/24542 | |
| 2018/0060365 A1* | 3/2018 | Mujumdar | G06F 21/6209 | |
| 2018/0060394 A1* | 3/2018 | Gawande | G06F 9/50 | |
| 2018/0060395 A1* | 3/2018 | Pathak | H04L 67/1029 | |
| 2018/0089271 A1* | 3/2018 | Kosuru | G06N 20/20 | |
| 2018/0181542 A1* | 6/2018 | Nica | G06F 17/18 | |
| 2018/0285421 A1* | 10/2018 | Tsuchida | G06F 16/2455 | |
| 2018/0336262 A1* | 11/2018 | Ghazal | G06F 16/24545 | |
| 2019/0079973 A1* | 3/2019 | Wang | G06F 16/24542 | |
| 2019/0286731 A1* | 9/2019 | Chiba | G06F 16/24522 | |
| 2019/0354621 A1* | 11/2019 | Wang | G06F 16/2453 | |
| 2019/0354622 A1* | 11/2019 | Sheldon | G06F 16/24542 | |
| 2019/0378028 A1* | 12/2019 | Chaudhuri | G06N 5/048 | |
| 2019/0384765 A1* | 12/2019 | White | G06F 16/24549 | |
| 2019/0384844 A1* | 12/2019 | Ding | G06F 16/24539 | |
| 2020/0012741 A1* | 1/2020 | Bracholdt | G06F 16/288 | |
| 2020/0134070 A1* | 4/2020 | Sidoti | G06F 16/23 | |
| 2020/0272667 A1* | 8/2020 | Ding | G06F 16/901 | |
| 2021/0064620 A1* | 3/2021 | Namaki | G06F 16/90324 | |
| 2021/0073449 A1* | 3/2021 | Segev | G06F 30/27 | |
| 2021/0096915 A1* | 4/2021 | Patel | G06F 9/4887 | |
| 2021/0097077 A1* | 4/2021 | Rogers | G06F 16/24542 | |
| 2021/0109932 A1* | 4/2021 | Chiba | G06F 16/24522 | |
| 2021/0124744 A1* | 4/2021 | Gladwin | G06F 16/24545 | |
| 2021/0133195 A1* | 5/2021 | Jiang | G06N 20/00 | |
| 2021/0157814 A1* | 5/2021 | Binder | G06F 16/24535 | |
| 2021/0209004 A1* | 7/2021 | Chen | G06F 16/2448 | |
| 2021/0279237 A1* | 9/2021 | Idreos | G06F 16/24545 | |
| 2021/0286784 A1* | 9/2021 | Chen | G06N 20/00 | |
| 2021/0357779 A1* | 11/2021 | Kabra | G06N 5/04 | |
| 2021/0390420 A1* | 12/2021 | Barnett | G06N 5/02 | |
| 2022/0019587 A1* | 1/2022 | Chen | G06F 16/217 | |
| 2022/0035812 A1* | 2/2022 | Balaraman | G06F 16/24535 | |
| 2022/0050840 A1* | 2/2022 | Parravicini | G06F 16/248 | |
| 2022/0067046 A1* | 3/2022 | Katroulis | G06F 11/3419 | |
| 2022/0083552 A1* | 3/2022 | Gupta | G06F 16/27 | |
| 2022/0092069 A1* | 3/2022 | Hartsing | G06F 16/24544 | |
| 2022/0100765 A1* | 3/2022 | Sun | G06F 16/2228 | |
| 2022/0113150 A1* | 4/2022 | Hidayat | G01C 21/3461 | |
| 2022/0138144 A1* | 5/2022 | Bastide | G06F 16/9536 | 707/662 |
| 2022/0165360 A1* | 5/2022 | Lee | G16H 20/10 | |
| 2022/0188308 A1* | 6/2022 | Sun | G06F 16/2453 | |
| 2022/0188315 A1* | 6/2022 | Wang | G06F 16/2386 | |
| 2022/0237178 A1* | 7/2022 | Sun | G06F 16/221 | |
| 2022/0284023 A1* | 9/2022 | Li | G06F 16/24537 | |
| 2022/0342887 A1* | 10/2022 | Cao | G06F 16/24549 | |
| 2023/0078577 A1* | 3/2023 | Sun | G06F 16/215 | 707/722 |
| 2023/0082446 A1* | 3/2023 | Zilio | G06F 16/24535 | 707/769 |
| 2023/0099501 A1* | 3/2023 | Li | G06F 16/24534 | 707/713 |

(56) References Cited

U.S. PATENT DOCUMENTS

| | | | |
|---|---|---|---|
| 2023/0153300 A1* | 5/2023 | Zhang | G06F 16/2228 707/715 |
| 2023/0177052 A1* | 6/2023 | Li | G06F 16/2358 707/713 |
| 2023/0222124 A1* | 7/2023 | Sun | G06F 16/24532 707/714 |

* cited by examiner

SELECTING ACCESS FLOW PATH IN COMPLEX QUERIES

BACKGROUND

The present disclosure relates to database management, and, more specifically, to selecting an efficient access path for high cost and complex queries.

Modern database systems can contain relatively large amounts of data, on the order of petabytes ($2^{50}$ bytes) and greater. Careful attention is given while generating the queries configured to retrieve, filter, sort, and/or perform other functions on the data. Minor variations in the queries can have a large effect on the efficiency of executing the query.

SUMMARY

Disclosed is a computer-implemented method to select an access path for high cost and/or complex queries. The method includes building a classification model configured to identify a lowest cost access path. The method further includes receiving a query, wherein the query is configured to retrieve a set of data from a database. The method also includes generating an access map for the query, wherein the access map includes one or more potential access paths to execute the query. The method includes collecting, for the query, a set of data for each potential access path. The method further includes classifying, by the classification model, the query. The method also includes selecting a first access path of the one or more potential access paths and executing the query. Further aspects of the present disclosure are directed to a system and a computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
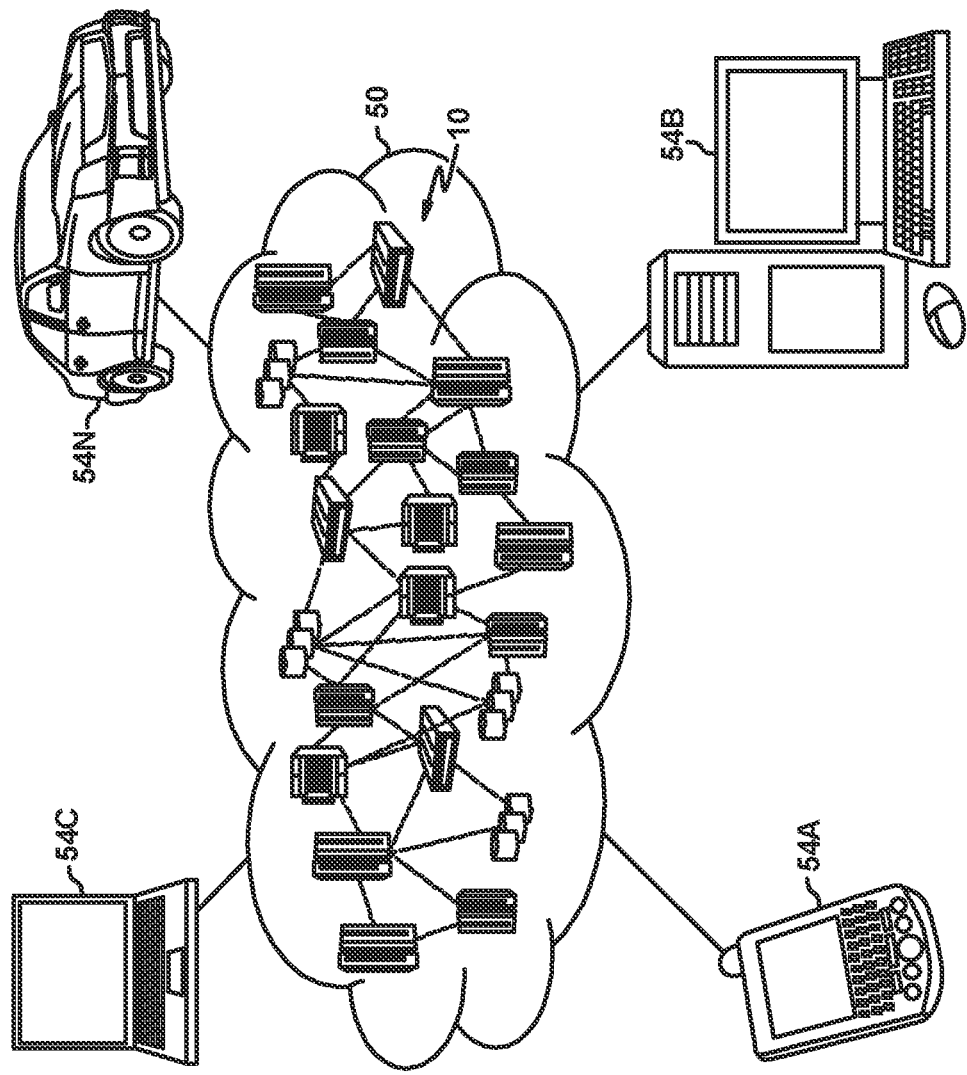
FIG. 1 depicts a cloud computing environment according to embodiments of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
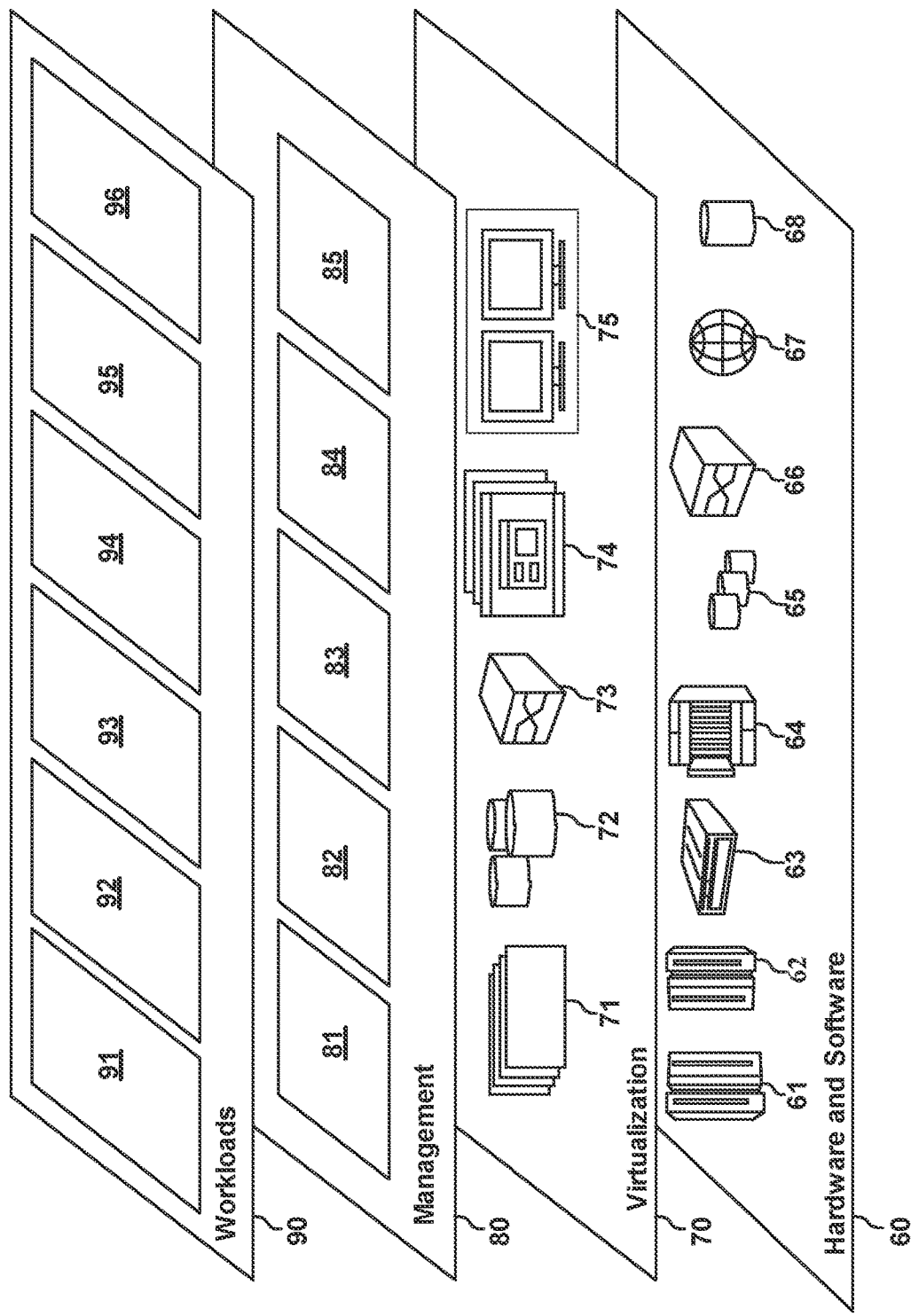
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
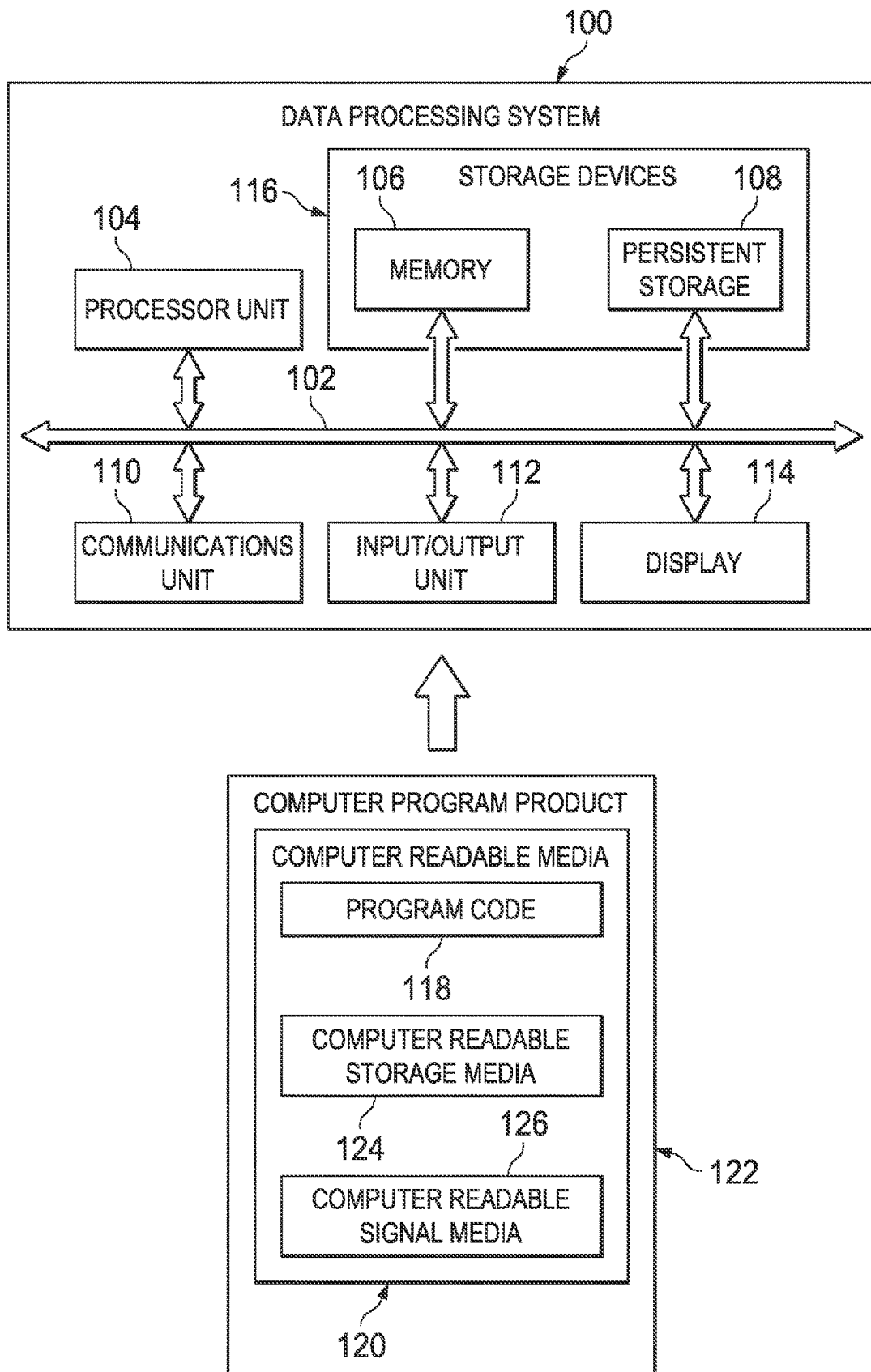
FIG. 3 is a block diagram of a DPS according to embodiments present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Selecting Access Path in Large Queries

Modern database systems can contain relatively large amounts of data, on the order of petabytes ($2^{50}$ bytes) and greater. This data can be accessed by queries configured to retrieve, filter, sort, and/or perform other functions on the data. Some queries can include several individual actions (e.g., fetch, sort, merge, etc.). In some cases, processing queries accounts for a majority of usage of database systems. The order in which the actions are performed (e.g., access path) can have a significant effect on the time and resources consumed to complete/process the query. The selection of the access path can be rules based or cost based, where cost based is more common.

Large queries can have a large number of potential access paths. At times, particularly in cost based systems, some access paths generated are eliminated/dropped without estimating a cost. At times the cost can be so large the system cannot estimate the cost (e.g., shows infinity). In other situations, a difference appears small enough that it cannot be determined, or said differently there is a poor differentiation between two potential access paths. This can result in a random access path being selected resulting in efficiency losses.

In order to select a more efficient access path, and/or prevent the dropping of a more efficient access path and/or a lowest cost access path, embodiments of the present disclosure can build/update a classification model to better calculate estimated costs and thereby select a more efficient access path. This can increase the overall efficiency of database systems and query performance.

Embodiments of the present disclosure can operate a query manager. The query manager can receive a query. The query can be configured to retrieve and perform functions on data stored in a database. In some embodiments, the query manager collects query data. The query data can include database statistics. The query data can also include the number and type of tables, the number of columns and other similar factors. The query manager can also generate an access map. The access map can show each potential access path. In some embodiments, the access map includes a main cost object (e.g., a first table, or a base table). The access map can include a number of query blocks. Query block can a basic unit of an SQL query that operation on tables or results of other queries/query blocks. The operations can include, joining, grouping, projections, and/or selection operations. Each query block can represent an object that is a target of the query.

In some embodiments, the query manager can classify the query. The classification can be performed by the model. The classification can estimate a cost for each query block. In some embodiments, the query manager selects an access path from the access graph. The access path can be based on the smallest estimated cost that is semantically correct. In some embodiments, the access path can be based on the smallest number of query blocks. In some embodiments, the classification is in response to determining that an estimated cost is above a threshold and/or that potential path is poorly differentiated. In some embodiments, the query manager executes the query and returns the results. The statistics from the query can be added to the statistics and used to update the model.

The aforementioned advantages are example advantages, and embodiments exist that can contain all, some, or none of the aforementioned advantages while remaining within the spirit and scope of the present disclosure.

Figure 4:
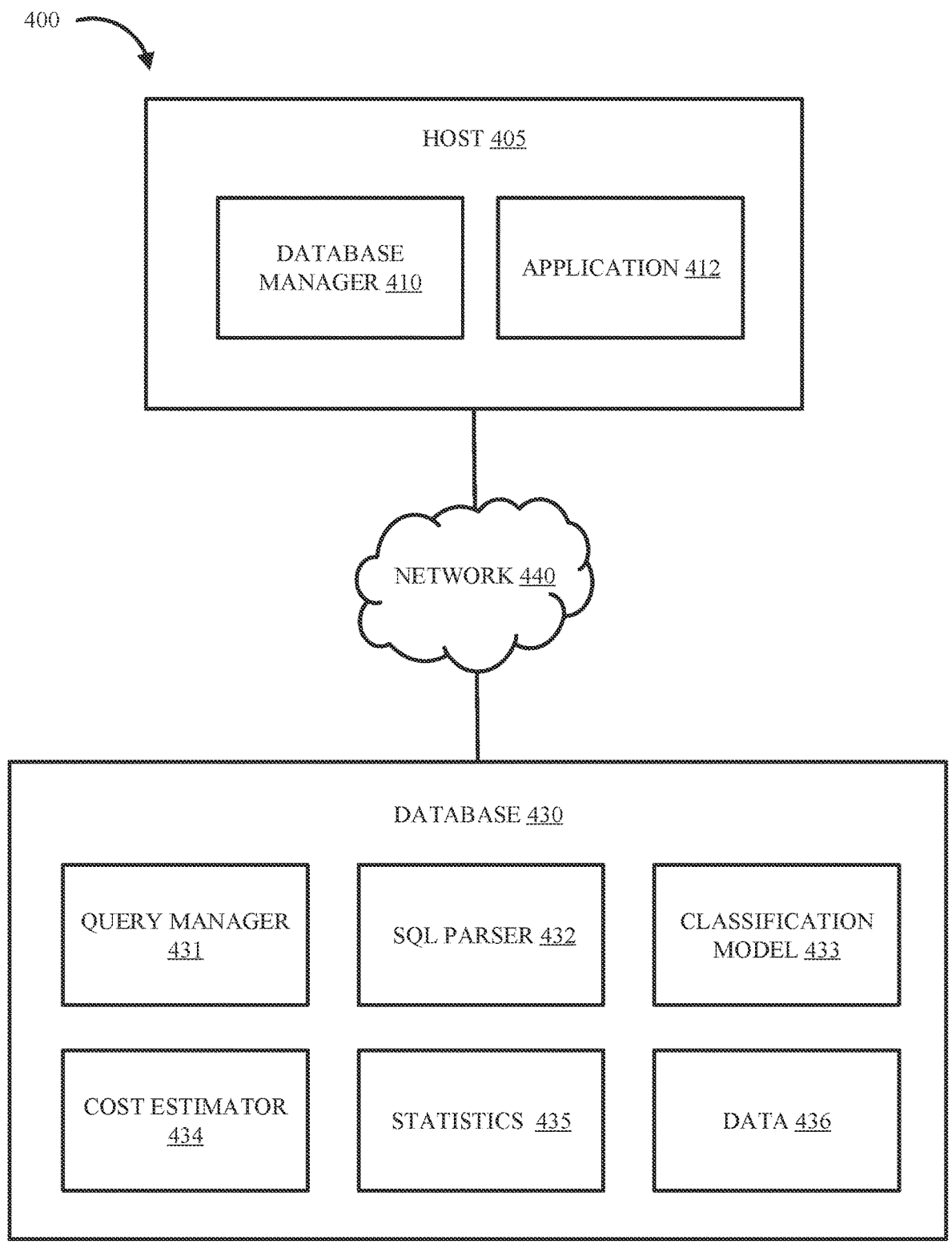
FIG. 4 is a functional diagram of a computing environment suitable for operation of a query manager according to embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, database 430, and/or the other computing devices in computing environment 400, can include a data processing system such as the data processing system 100. In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, application 412 is included in database manager 410. In some embodiments, application 412 can generate/send two or more different queries. In some embodiments, the two or more queries can have similar characteristics and/or be of a similar type. The similarity can cause identification of errors in the queries to be identified, based on an error in a similar query.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, the query is generated in SQL. In some embodiments, application 412 displays the results of the query. The results may be returned in an SQL format, and/or as images, graphs, trends, and/or other similar formats.

Database 430 can be any combination of hardware and/or software configured to store data in a database system. In some embodiments, database 430 is part of a federated database system. In some embodiments, database 430 includes two or more databases communicatively connected that can act as a single database. In some embodiments, database 430 may be contained within host 405. In some embodiments, database 430 can include query manager 431, SQL parser 432, classification model 433, cost estimator 434, statistics 435, and data 436.

Query manager 431 can be any combination of hardware and/or software configured to oversee execution of an SQL query. In some embodiments, query manager 431 includes one or more of SQL parser 432, classification model 433, cost estimator 434, and statistics 435. However, FIG. 4 depicts them as separate components for discussion purposes.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 develops one or more access plans. The access plan may include a stack(set) of commands, where each command is considered a node. In some embodiments, SQL parser 432 can include an optimizer. An optimizer can identify an access path that appears to have the least cost.

In some embodiments, SQL parser 432 generates a path graph. A path graph can be representation of the potential access paths that can be taken to execute the query. For example, assume a query will combine one column from three different table 1, 2, and 3 and starts with table 1 as the base table. The path graph can show the of merging table 2 with table 1 and then adding table 3; and the second option of merging table 3 with table 1 then adding table 2. In some embodiments, each table and/or step in execution can be represented by a node. In some embodiments, the path graph can split nodes. Each index for a table/node can be split to further build the path graph. In some embodiments, the path graph can indicate an order in which query block are combined.

In some embodiments, the path graph includes a main cost object (or base node, or base table). The base node can be the starting point of the path graph. In some embodiments, the base table can be based on a minimum cost, on a table statistics (e.g., table size, entries, usage, etc.), and/or other similar factors.

Classification model 433 can be any combination of hardware and/or software configured to classify a query. The classification can be for the query as a whole or for a portion of the query. In some embodiments, classification model 433 can identify/predict access paths, max cost, differentiation costs (e.g., tiny differentiation), cost per activity (e.g., usage for merge commands, etc.) query type, and other similar characteristics. In some embodiments, the classifications can be based on the query inputs, statistics, resource usage, cost per object activity, and similar queries.

In some embodiments, classification model 433 includes a learning model. The learning model can be any machine learning process. In some embodiments, the learning model can be trained, by training data, to classify the query. In some embodiments, the training data can include statistics and CPU usage from previously executed queries. In some embodiments, training data can be updated as new queries are processed.

In some embodiments, classification model 433 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Cost estimator 434 can be any combination of hardware and/or software configured to estimate the computing cost of a query. In some embodiments, the cost estimator 434 can estimate a computing cost to execute a query or a portion of a query. In some embodiments, cost estimator 434 can estimate the cost of one or more access path from an access map. In some embodiments, cost estimator 434 can estimate an overall query cost. These can be prior to and/or in conjunction with classification model 433.

Statistics 435 can be any combination of hardware and/or software configured to store database statistics. In some embodiments, statistics 435 can include database statistics. In some embodiments, statistics 435 tracks distribution of values in the tables and indexes in the database (e.g., data 436). In some embodiments, statistics 435 is updated and maintained by database manager 410. In some embodiments, statistics 435 includes frequency data. Frequency data represents the relative occurrence of a given value. In some embodiments, statistics 435 includes histograms. Histograms may represent relative occurrences of a range of values.

In some embodiments, database statistics keeps a record of each query received. This can include the source of the query (e.g., application 420), the structure, the target data, and other similar data. In some embodiments, the common query includes data ranges queried, query efficiency, and/or query execution time. In some embodiments, queries can be organized/categorized according to a target table, a predicate (e.g., filter, target), and other similar factors.

Data 436 can be any data structure configured to store and organize data. In some embodiments, data 436 can include one or more data structures. The data structures can include tables, indices, indexes, columns, and the like. The data structures can be the target of the queries. Data 436 can include one or more separate tables and/or one or more indexes. Each table/index can include one or more columns. In some embodiments, data 436 is a target of queries.

Figure 5:
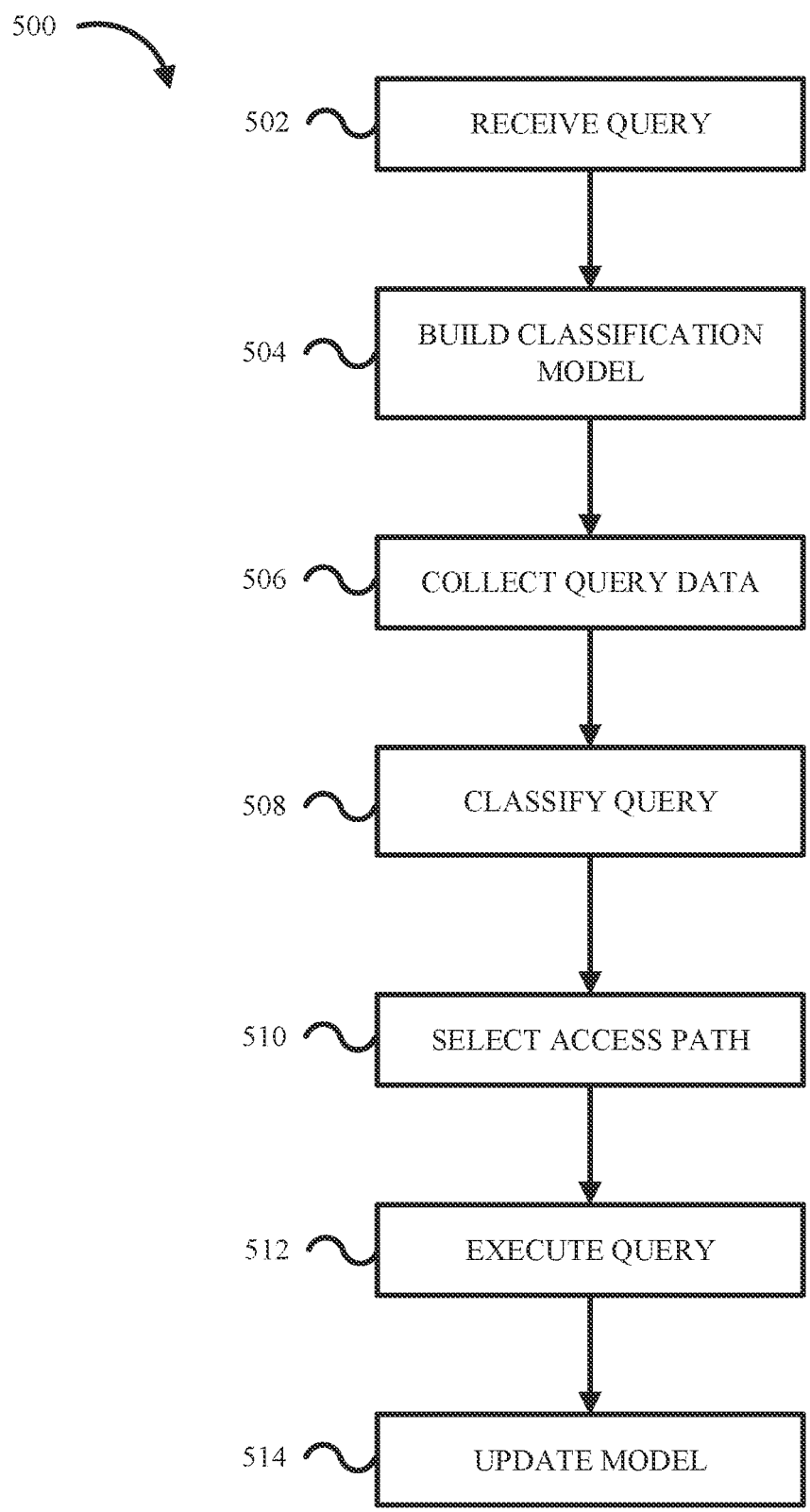
FIG. 5 is a flow chart of an example method to dynamically identify an access path in a large query according to embodiments present disclosure.

FIG. 5 is a flow chart of an example method, 500, to dynamically identify a lower cost access path for a query according to embodiments of the present disclosure. The method 500 can be performed in a computing environment (e.g., computing environment 400 and/or cloud computing environment 50). One or more of the advantages and improvements described above for identifying a lower cost access path may be realized by method 500, consistent with various embodiments of the present disclosure.

Method 500 can be implemented by one or more processors, host 405, database manager 410, application 412, database 430, query manager 431, SQL parser 432, classification model 433, cost estimator 434, statistics 435, data 436. and/or a different combination of hardware and/or software. In various embodiments, the various operations of method 500 are performed by one or more of host 405, database manager 410, application 412, database 430, query manager 431, SQL parser 432, classification model 433, cost estimator 434, statistics 435, and/or data 436. For illustrative purposes, the method 500 will be described as being performed by query manager 431.

At operation 502, query manager 411 receives a query. In some embodiments, the query is received from application 420. In some embodiments, the query is received in SQL. In some embodiments, the query is configured to perform one or more commands on a set of data, wherein the data is stored in database 430. In some embodiments, operation 502 includes parsing the query. The query may be parsed by SQL parser 432. In some embodiments, operation 402 include generating an access map. The access map can represent one or more paths that can be used to fully execute the query. In some embodiments, the query is received from application 412, database manager 410, and/or host 405.

In some embodiments, operation 502 includes calculating and estimated cost for each query. The estimated cost can be an overall estimated cost. In some embodiments, the estimated cost is above a threshold. This can occur when estimation is so large that the query manager cannot calculate it. The query manager may return an infinity and/or an undefined cost. The infinity and undefined cost can be above threshold. In some embodiments, the threshold can be a predetermined number. The predetermined number can be based on the analysis of previously executed queries.

In some embodiments, a cost is estimated for each potential access path in the access map. In some embodiments, the difference between the costs of any two access paths may be poorly differentiated, negligible and/or very small. An estimated cost of a first query and an estimated cost of a second query can be poorly differentiated if they are within a threshold (e.g., a predetermined percentage, etc.). For example, the two access paths may be poorly differentiated if the ratio is between costs is between 0.99 and 1.01. In some embodiments, the two access paths are poorly differentiated if the estimated costs are equivalent.

At operation 504, query manager 431 builds/retrieves a classification model (or model) (e.g., classification model 433). In some embodiments, operation 504 includes sending the model through the classification model. The classification model can classify the parts of the query. In some embodiments, the classification model can cluster data points into the nearest cluster.

In some embodiments, the model includes a similarity model. The similarity model can identify similar characteristics between two or more queries. The statistics from a previously executed query can be used to identify characteristics of a current query.

At operation 506, query manager 431 collects query data. In some embodiments, collecting the query data includes obtaining/receiving database statistics (e.g., from statistics 435). In some embodiments, the collected data is all data needed for the calculations. The calculations are used to estimate the cost of the actions associated with the query. In some embodiments, the collected data is based on the database objects. The objects can include tables, columns, index, data distributions, and the like. The data related to tables can include table type, column count, clusters, and the like. The column data can include column type, column length, average length, high key, low keys, and the like. The index data can include index type, index cluster, pages, partitions, related tables, and the like. The data distributions can include type of data (e.g., numerical, string, binary, etc.)

At operation 508, query manager 431 classifies the query. In some embodiments, the classification is performed by the model. In some embodiments, the model inputs include the data collected in operation 506. In some embodiments, the inputs to the model can include the access map, one or more access paths, and/or the database statistics.

In some embodiments, the classification includes estimating a cost (or determining and estimated cost). This can be an output of the classification model. The estimation can include one or more of or a combination of cost per object, cost per activity, cost per query block, and other similar costs. The cost can be differentiated for different indexes, when more than one index is available.

In some embodiments, the classification is in response to determining the estimated cost is above a threshold and/or the estimated cost is infinity/undefined. In some embodiments, the classification is in response to a poor differentiation between an estimated cost of a first access path and the estimated cost of a second access path.

At operation 510 query manager 431 selects an access path. In some embodiments, the selection is based on the estimated cost. The selected path can be the minimum estimated cost. In some embodiments, the selected path can be the path with the least number of query blocks (e.g., shortest path from the starter table to completion, least number of nodes). In some embodiments, the access path selected is semantically correct, where semantically correct means it will return the correct set of data based on the query.

At operation 512 query manager 431 executes the query. In some embodiments, the query is executed based on the access plan. In some embodiments, query manager 431 returns the results. In some embodiments, the results are returned to the requestor (e.g., host 405, application 412). In some embodiments, the results can be displayed/viewed on one or more devices. In some embodiments, operation 512 includes generating a runtime structure from the access path.

In some embodiments, operation 512 include storing, for the executed query, a set of actual statistics. The actual statistics can represent the actual cost and other data related to executing the query. In some embodiments, the actual statistics can be added to the training data. The actual statistics can include a query type, a set of query statistics, a cost per object (e.g., tables), a cost per activity, and a total cost.

At operation 514, query manager 431 updates the model. The statistics from executing the query can be added to the statistics and/or training data. In some embodiments, the model is retrained with the new data.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   building a classification model configured to identify a lowest cost access path;
   receiving a query, wherein the query is configured to retrieve a set of data from a database;
   generating, in response to receiving the query, an access map for the query, wherein the access map includes two or more potential access paths to execute the query including a first access path and a second access path;
   collecting, for the query, a set of data for each of the two or more potential access paths;
   generating an estimated execution cost for each of the two or more access paths, including a first estimated cost for the first access path and a second estimated cost for the second access path;
   determining that the first estimated cost and the second estimated cost are within a predetermined threshold;
   classifying, by the classification model and in response to the determining the first estimated cost and the second estimated cost are within a predetermined threshold, the query, wherein the classifying includes estimating a cost for each query block of the two or more potential access paths;
   selecting, in response to the classifying, the first access path of the two or more potential access paths; and
   executing, in response to the selecting, the query according to the first access path.

2. The method of claim 1, wherein the access map includes a plurality of nodes, and each node corresponds to a query block.

3. The method of claim 2, wherein the classifying further comprises:
calculating an estimated cost for each query block.

4. The method of claim 3, wherein selecting the first access path is based on the first access path having a lowest estimated total cost.

5. The method of claim 3, wherein selecting the first access path is based on the first access including a lowest number of query blocks.

6. The method of claim 1, wherein building the classification model comprises:
training, by a set of training data, the classification model, wherein the classification model is a machine learning model, and the training data includes database statistics.

7. The method of claim 6, wherein the training further comprises:
analyzing a set of previously executed queries; and
calculating, for each previously executed query, a query type, a set of query statistics, a max cost, a differentiation cost, a cost per object, a cost per activity, and a total cost.

8. The method of claim 1, further comprising:
storing, in response to executing the query, for the query, a set of actual statistics for the first query;
adding the set of actual statistics to the training data; and
updating the classification model.

9. The method of claim 1, further comprising:
calculating an estimated overall cost to execute the query; and
determining that the estimated overall cost is above a threshold,
wherein, the classifying of the query is in response to determining the estimated overall cost is above the threshold.

10. The method of claim 3, wherein selecting the first access path is based on the first access path being semantically correct.

11. A system comprising:
a processor; and
a computer-readable storage medium communicatively coupled to the processor and storing program instructions which, when executed by the processor, are configured to cause the processor to:
build a classification model configured to identify a lowest cost access path;
receive a query, wherein the query is configured to retrieve a set of data from a database;
generate, in response to the receiving the query, an access map for the query, wherein the access map includes two or more potential access paths to execute the query including a first access path and a second access path;
collect, for the query, a set of data for each of the two or more potential access paths;
generate an estimated execution cost for each of the two or more access paths including a first estimated cost for the first access path and a second estimated cost for the second access path;
determine that the first estimated cost and the second estimated cost are within a predetermined threshold;
classify, by the classification model and in response to the determining the first estimated cost and the second estimated cost are within a predetermined threshold, the query, wherein the classifying includes estimating a cost for each query block of the two or more potential access paths;
select, in response to the classifying, the first access path of the two or more potential access paths; and
execute, in response to the selection, the query according to the first access path.

12. The system of claim 11, wherein the program instructions are further configured to cause the processor to:
calculate an estimated overall cost to execute the query; and
determine the estimated overall cost is above a threshold,
wherein, the query is classified in response to determining that the estimated overall cost is above the threshold.

13. The system of claim 11, wherein the access map includes a plurality of nodes, and each node corresponds to a query block.

14. The system of claim 11, wherein the program instructions are further configured to cause the processor to:
train, by a set of training data, the classification model, wherein the classification model is a machine learning model, and the training data includes database statistics.

15. A computer program product, the computer program product comprising a computer readable storage medium having program instructions embodied therewith, the program instructions executable by a processing unit to cause the processing unit to:
build a classification model configured to identify a lowest cost access path;
receive a query, wherein the query is configured to retrieve a set of data from a database;
generate, in response to the receiving the query, an access map for the query, wherein the access map includes two or more potential access paths to execute the query including a first access path and a second access path;
collect, for the query, a set of data for each of the two or more potential access paths;
generate an estimated execution cost for each of the two or more access paths including a first estimated cost for the first access path and a second estimated cost for the second access path;
determine that the first estimated cost and the second estimated cost are within a predetermined threshold;
classify, by the classification model and in response to the determining the first estimated cost and the second estimated cost are within a predetermined threshold, the query, wherein the classifying includes estimating a cost for each query block of the two or more potential access paths;
select, in response to the classifying, the first access path of the two or more potential access paths; and
execute, in response to the selection, the query according to the first access path.

16. The computer program product of claim of claim 15, wherein the program instructions are further configured to cause the processing unit to:
calculate an estimated overall cost to execute the query; and
determine the estimated overall cost is above a threshold,
wherein, the query is classified in response to determining that the estimated overall cost is above the threshold.

17. The computer program product of claim 15, wherein the access map includes a plurality of nodes, and each node corresponds to a query block.

18. The computer program product of claim of claim 15, wherein the program instructions are further configured to cause the processing unit to:
    train, by a set of training data, the classification model, wherein the classification model is a machine learning model, and the training data includes database statistics.

\* \* \* \* \*